United States Patent
Kolton et al.

(10) Patent No.: US 7,937,975 B2
(45) Date of Patent: May 10, 2011

(54) WHEEL BOOT

(75) Inventors: Chester Kolton, Westfield, NJ (US);
Michael Norman, East Brunswick, NJ (US)

(73) Assignee: B&G Plastics, Inc., Newark, NJ (US)

( * ) Notice: Subject to any disclaimer, the term of this patent is extended or adjusted under 35 U.S.C. 154(b) by 0 days.

(21) Appl. No.: 12/606,227

(22) Filed: Oct. 27, 2009

(65) Prior Publication Data

US 2010/0107708 A1    May 6, 2010

Related U.S. Application Data

(60) Provisional application No. 61/110,212, filed on Oct. 31, 2008.

(51) Int. Cl.
*E05B 73/00*    (2006.01)

(52) U.S. Cl. .......... 70/57.1; 70/63; 70/226; 70/232; 188/32; 206/304; 206/807; 280/825; 240/572.8; 240/572.9

(58) Field of Classification Search .......... 70/57.1, 70/63, 158, 163, 178, 179, 19, 259, 260, 70/225, 226, 209, 232; 206/304, 807; 340/572.8, 340/572.9; 188/32; 280/87.042, 825
See application file for complete search history.

(56) References Cited

U.S. PATENT DOCUMENTS

| | | | |
|---|---|---|---|
| 1,127,432 A * | 2/1915 | Green | 206/304 |
| 1,387,525 A * | 8/1921 | Warner | 206/304 |
| 1,594,710 A * | 8/1926 | Buffington et al. | 206/304 |
| 1,602,488 A * | 10/1926 | Heilman | 206/304 |
| 1,604,993 A * | 11/1926 | Grilli | 206/304 |
| 1,734,540 A * | 11/1929 | Sutherland | 206/304 |
| 1,839,598 A * | 1/1932 | Salbador | 292/307 B |
| 3,685,676 A | 8/1972 | Gach et al. | |
| 3,756,444 A | 9/1973 | McIntosh | |
| 3,764,446 A * | 10/1973 | Martin | 428/52 |
| 3,853,236 A | 12/1974 | Ostrowsky | |
| 3,915,326 A | 10/1975 | Hrubesky | |
| 4,089,463 A | 5/1978 | Babiol | |
| 4,405,161 A | 9/1983 | Young et al. | |
| 4,457,445 A | 7/1984 | Hanks et al. | |
| 4,471,982 A | 9/1984 | Nielsen, Jr. | |
| 4,658,955 A * | 4/1987 | Eichner | 206/307 |
| 4,674,778 A | 6/1987 | Ruiz | |
| 4,729,487 A | 3/1988 | Wright | |
| 4,813,564 A | 3/1989 | Cooper et al. | |
| 4,895,253 A * | 1/1990 | Yaeger | 206/387.11 |
| 5,031,768 A * | 7/1991 | Fischer | 206/370 |
| 5,385,373 A * | 1/1995 | Love | 292/307 B |
| 5,417,319 A * | 5/1995 | Chalberg et al. | 206/1.5 |
| 5,602,530 A | 2/1997 | Holmgren | |
| 5,625,347 A | 4/1997 | MacLean et al. | |
| 5,667,085 A | 9/1997 | Ogden et al. | |
| 6,137,413 A | 10/2000 | Ryan, Jr. | |
| 6,254,139 B1 | 7/2001 | Fresnel | |
| 6,360,908 B1 | 3/2002 | Kline | |

(Continued)

*Primary Examiner* — Lloyd A Gall
(74) *Attorney, Agent, or Firm* — Hoffmann & Baron, LLP

(57) ABSTRACT

A boot is positionable about a rotatable wheel having an axle extending therefrom. A pair of mating components include interconnecting elements for attaching the elements about the wheel preventing non-destructible detachment of the mating components. Flanges extend from the mating components to prevent attempts to rotate the boot about the wheel. The flanges which support the interconnecting elements are frangibly removable from the body to permit destructible detachment of the mating components from the wheel. The boot may support an electronic tag such as radio frequency identification (RFID) tag or an electronic article surveillance (EAS) tag.

12 Claims, 3 Drawing Sheets

U.S. PATENT DOCUMENTS

| | | |
|---|---|---|
| 6,604,643 B1 | 8/2003 | Michael et al. |
| 6,696,955 B2 | 2/2004 | Kolton et al. |
| 7,048,179 B2 | 5/2006 | Claessens et al. |
| 7,394,383 B2 | 7/2008 | Hager et al. |
| 2007/0062903 A1 | 3/2007 | Norman et al. |

* cited by examiner

WHEEL BOOT

CROSS-REFERENCE TO RELATED APPLICATION

This application claims priority to U.S. Provisional Patent Application No. 61/110,212, filed on Oct. 31, 2008, which is incorporated herein by reference.

FIELD OF THE INVENTION

The present invention relates generally to an apparatus for immobilizing rolling devices deployed with small-diameter wheels. More particularly, the present invention relates to a fixed or partially rotatable boot which may be positioned over skateboard or roller-skate wheels, thereby deterring theft and/or unauthorized use in a retail environment, while still permitting the purchaser to stand thereon.

BACKGROUND OF THE INVENTION

There are a wide variety of wheeled toys, recreational and sports equipment. Devices such as skateboards, roller skates and the like have long been used for sports and recreation.

Skateboards are an example of one such device which are sold in numerous retail outlets. Skateboards vary in size and shape but are principally comprised of a generally planar oblong board termed the deck. The boards may be laminate, wood or a combination of materials providing adequate support for a rider. The rider assumes a stance upon the upper surface of the board, called a deck, which may have disposed an appropriate non-slip material.

Typical skateboard wheels are made of polyurethane or other plastics in diameters ranging from approximately 48 mm and greater. The relatively small diameter contributes to a desirably low center of gravity. Harder durometer materials are generally preferred, as these reduce friction and permit higher speed. The wheels are attached to the underside of the deck as part of truck assemblies including two wheels, an axle, ball bearings and other components. Bushings in the truck axles allow sufficient lean angle for steering. Typically the underside of the deck includes two trucks, fore and aft. The parallel axles transect the skateboard deck widthwise, connecting a pair of diametrically opposed wheels near each corner of the oblong in an alignment minimizing rotational friction.

Hard wheels adapted to pavement may leave undesirable marks in carpet, linoleum or other resilient flooring. The riding of skateboards through a retail area may result in damage, undue wear-and-tear and accidental injury. Moreover, as current skateboards are relatively expensive, the risk of theft from the retail store is of concern. Therefore, it is often desirable to provide a security device attachable to such skateboard which will be a theft deterrent.

SUMMARY OF THE INVENTION

The present invention provides a boot for placement about a rotatable wheel having an axle extending therefrom. The boot includes a pair of mating components. Each of the mating components has a body and a pair of oppositely directed elongate flanges extending from the body. The flanges include interconnecting elements extending therefrom. The interconnecting elements of one of the mating components is engageable with the interconnecting elements of the other mating component for preventing non-destructible detachment of the mating components. The flanges extend from the mating components to abut a planar surface adjacent the wheel upon attempted rotation of the boot about the wheel. The flanges further include a frangible location positioned between the body and the interconnecting elements for frangible removal of the interconnecting elements so as to permit destructible detachment of the mating components from the wheel.

DETAILED DESCRIPTION OF THE PREFERRED EMBODIMENT

Figure 1:
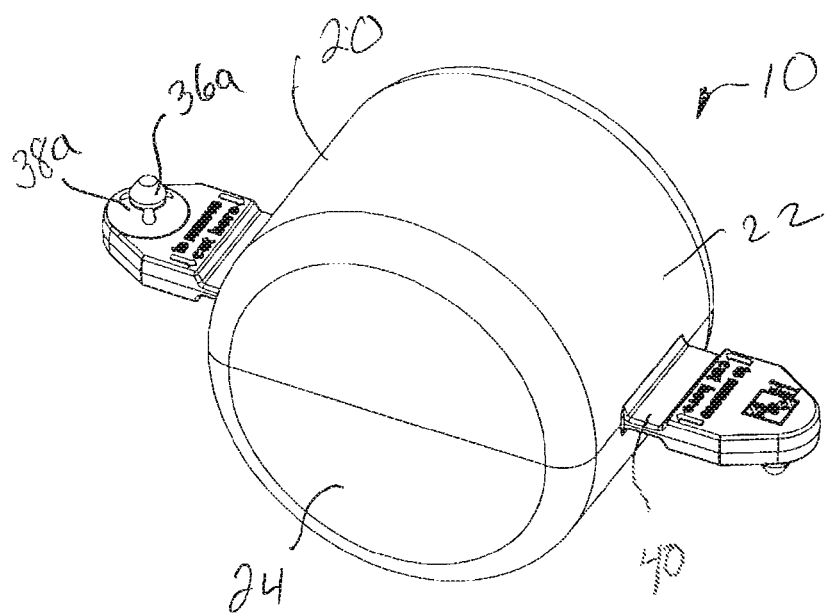
FIG. 1 is a perspective showing of the boot of the present invention.

The present invention provides a boot which is used for placement over at least one wheel of a wheel device such as a skateboard and which prevents the propelling of the device by limiting the rotation of the wheel over which it is placed. Furthermore, the boot of the present invention may be adapted to support a tag which is used to track the item such as, for example, an inventory control or security tag, more specifically, a radio frequency identification (RFID) tag or an electronic article surveillance (EAS) tag.

Referring to the figures, the present invention provides a boot 10 for placement over a wheel 12 of a truck assembly 14 of a conventional skateboard 16. While a skateboard is shown as a preferred embodiment for use with the boot of the present invention, it is within the contemplation of the present invention to use the boot in combination with other wheeled devices. The boot 10 includes a generally cylindrical body 20 including a cylindrical wall 22 including a flat end wall 24 and an annular wall 26 opposite therefrom. The underside 25 of end wall 24 may support an electronic tag 27.

Figure 3:
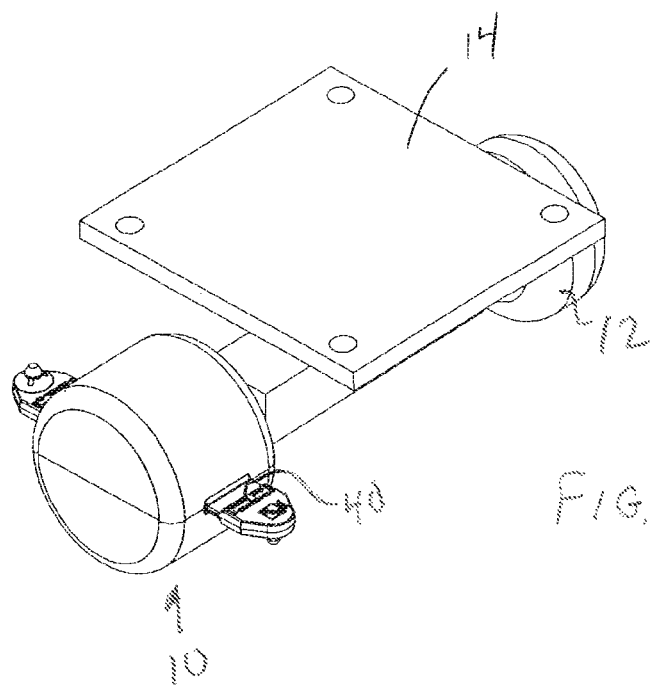
FIG. 3 is a perspective view of the boot of FIG. 1 attached to the truck assembly of a skateboard.
Figure 4:
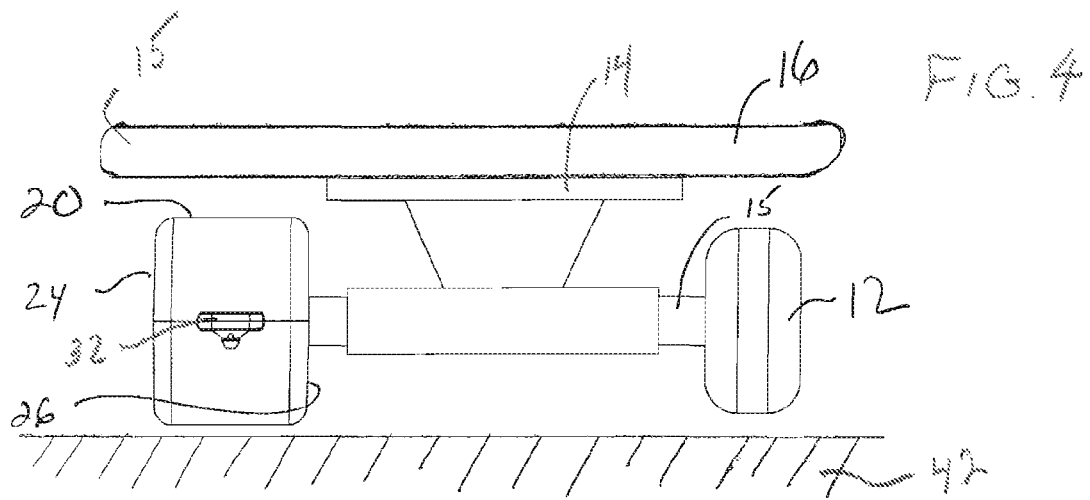
FIG. 4 is a plan view of the boot of the present invention attached to the truck, assembly of a skateboard and positioned on a floor surface.

Annular wall 26 defines an inwardly directed lip 26a which allows engagement of the boot around the wheel 12. As shown in FIGS. 3 and 4, the boot 20 may be positioned over the wheel 12 with an opening 26b in annular wall 26 allowing passage of the axle 15 of truck assembly 14 to pass therethrough.

Figure 2:
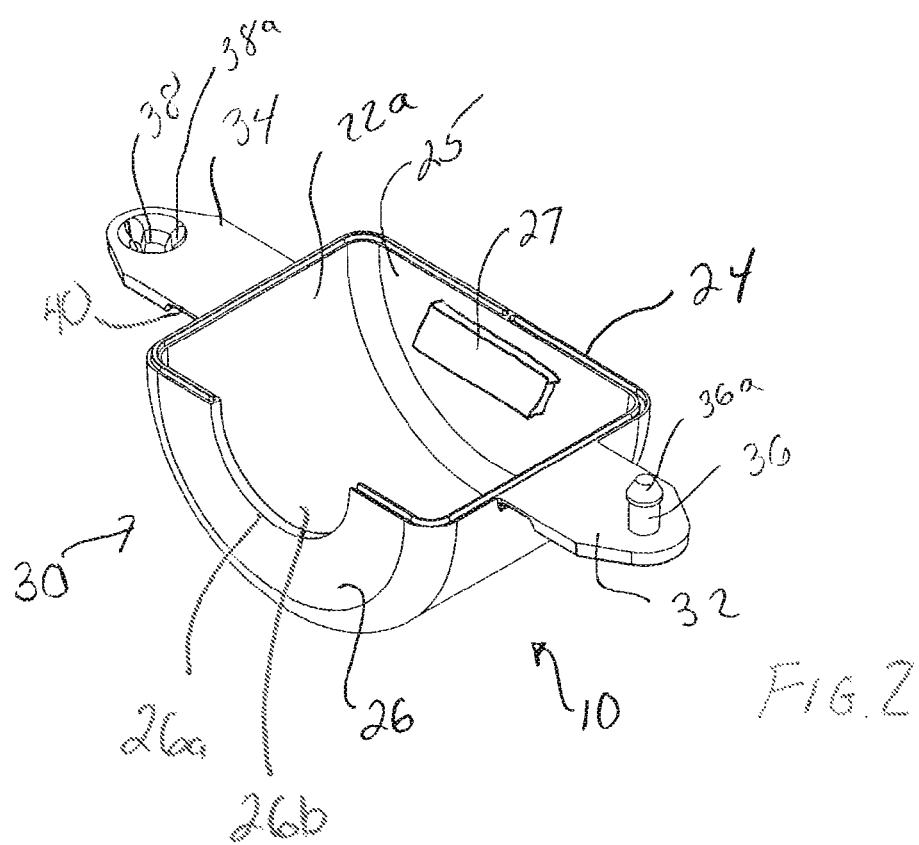
FIG. 2 is a perspective view of one of two identical components used to form the boot of the present invention.

As particularly shown in FIG. 2, the boot is formed from a pair of identical mating components 30. Each component 30 is preferably an identical hermaphroditic component. The components 30 may be fitted together about wheel 12 to form the boot thereabout. Each component 30 has a generally semi-cylindrical wall 22a which together form cylindrical wall 22. A pair of diametrically opposed flanges 32 and 34 extend outwardly from semi-cylindrical wall 22a. Flanges of the mating components are placed together when the components are assembled into the boot 10. The flanges include interconnecting elements which provide for interlocking mating of two components. Flange 32 includes an integrally formed outwardly extending post 36 while flange 34 includes at a distal end thereof a receiving aperture 38 for accommodating post 36. The post 36 of one component is designed for interlocking one-way snap engagement with the aperture 38 of the other component to form body 20. The interlocking engagement of the post with the aperture prevents non-destructible detachment of the components once the components have been attached.

In the preferred example shown herein, post 36 includes a tapered distal element 36a, while aperture 38 includes inwardly directed deflectable fingerlike elements 38a which provides for such one way locking engagement with distal element 36a.

The flanges 32 and 34 are elongate members with the respective posts and apertures at distal ends thereof. Intermediate thereof and adjacent body 20 the flanges include an area of reduced thickness forming a two-sided groove 40. Groove 40 forms a frangible location which allows the flanges to be detached from the body 20. The detachment can be preferably achieved by use of a suitable cutting tool. Detachment of the flanges removes the locking mechanism which interlocks the two components together thereby allowing detectable disassembly of the mating components and removal of the boot from the wheel.

The assembly mating components 30 define annular wall 26 which, as shown in FIGS. 3 and 4, may be positioned about the axle 15 extending from wheel 12. This arrangement allows the boot to be rotated about the wheel 12, but cannot be removed therefrom without destructively disassembling the boot by separating the components by frangibly removing the flanges.

Additionally, the flanges 32 and 34 form an extending structure which prevents full rotation of the boot about the wheel when the boot is used in combination with a skateboard deck on a planar surface such as a floor 42.

Figure 5:
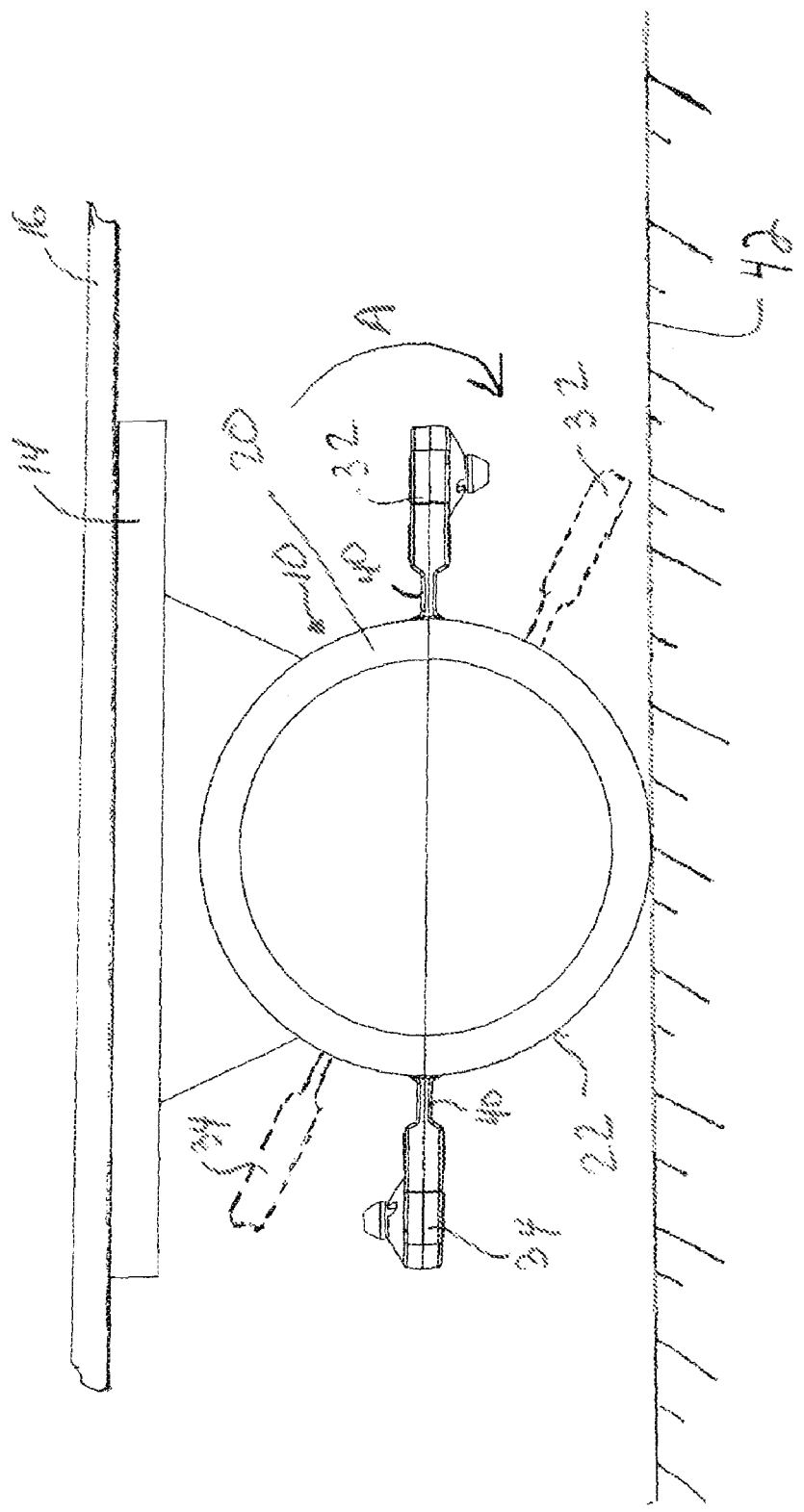
FIG. 5 is a plan view of the boot of the present invention, with partial rotation thereof shown in phantom.

As shown in FIGS. 4 and 5, when skateboard 16 is used on a flat surface such as a floor 42, the boot 10 placed over the wheel 12 prevents the wheel from fully rotating in response to pushing or pumping the skateboard on the floor 42. This immobilizes the skateboard by preventing it from being propelled. The boot, however, allows the user to stand on the deck of the skateboard so that the user can evaluate features such as balance, stiffness, and other characteristics typically considered in purchasing a skateboard. Any attempt, however, to propel the device will result in only partial rotation of the boot 10. As shown in further detail in FIG. 5, the flanges 32, 34 are constructed to be of sufficient extent from body 20 that they will be placed in intersecting engagement with either or both of the undersurface of the deck 15 of the skateboard 16 or the floor 42 thereby preventing continued rotation of the wheel 12 and linear movement of the skateboard. For example, during an attempt to propel the skateboard 16, the wheel and boot 10 will be rotated in the direction of arrow A. Continued rotation of the boot will be prevented when flange 34 engages floor 42. This will prevent the propelling of skateboard 16.

In order to use the skateboard in the proper manner, the boot 10 would have to be removed by frangibly detaching the flanges 32, 34 from the body 20 to permit detachment of the mating components. While such is desired after the skateboard is purchased, any attempt to do so prior to purchase would provide an indication of tampering. When used with an electronic tag, it would also indicate that the tag was removed prior to purchase.

Various changes and adaptations to the foregoing described and shown structures would now be evident to those skilled in the art. Accordingly, the particularly disclosed scope of the invention is set forth in the following claims.

What is claimed is:

1. An assembly comprising:
   a recreational device having a deck and at least one rotatable wheel supported on an axle secured to said deck, said recreational device being capable of being propelled on a planar surface by rotation of said at least one wheel; and
   a boot for placement about said rotatable wheel, said boot comprising:
   a pair of mating components, each said mating component having a body and a pair of oppositely directed elongate flanges extending from said body;
   said flanges including interconnecting elements extending therefrom, the interconnecting elements of one of said mating components being engageable with the interconnecting elements of the other said mating component for preventing non-destructible detachment of said mating components;
   said flanges extending from said mating components to abut at least one of said planar surface and said deck upon attempted rotation of said boot;
   said flanges further including a frangible location positioned between said body and said interconnecting elements for frangible removal of said interconnecting elements so as to permit detectable detachment of said mating component from said wheel.

2. An assembly of claim 1 wherein said body of each of said mating components is semi-cylindrical having a closed wall at one end and a partially open wall for accommodating said axle and a semi-annular lip.

3. An assembly of claim 2 wherein said interconnecting elements include a post extending from one of said flanges of said mating component and a receiving aperture through said other of said flanges of said mating component, said post of one said mating component being lockingly insertable into the receiving aperture of said other mating component.

4. An assembly of claim 1 wherein said mating components are identically formed.

5. An assembly of claim 1 wherein said mating components are hermaphroditically formed.

6. An assembly of claim 1 wherein at east one of said mating components supports an electronic tag.

7. An assembly of claim 6 wherein said at least one said mating component includes a surface for supporting said electronic tag.

8. An assembly of claim 7 wherein said surface is an internal surface.

9. An assembly of claim 1 wherein said frangible location is defined by a groove.

10. An assembly of claim 3 wherein said post extends from a distal extent of said one of said flanges and said aperture extends through a distal extent of the other of said flanges.

11. An assembly of claim 1 wherein said interconnecting elements are integrally formed with said flanges.

12. An assembly of claim 1 wherein said flanges extend from said mating components a distance sufficient to engage both an undersurface of said deck and said planar surface.

* * * * *